United States Patent
Wöhrle et al.

(10) Patent No.: US 8,113,074 B2
(45) Date of Patent: Feb. 14, 2012

(54) GEAR FOR AN ADJUSTING DEVICE

(75) Inventors: Michael Wöhrle, Niedereschach (DE); Stéphane Birker, Donaueschingen (DE)

(73) Assignee: IMS Gear GmbH, Eisenbach (DE)

( * ) Notice: Subject to any disclaimer, the term of this patent is extended or adjusted under 35 U.S.C. 154(b) by 110 days.

(21) Appl. No.: 11/322,589

(22) Filed: Jan. 3, 2006

(65) Prior Publication Data
US 2006/0150758 A1 Jul. 13, 2006

(30) Foreign Application Priority Data
Jan. 11, 2005 (DE) .................. 10 2005 001 333

(51) Int. Cl.
*F16H 29/20* (2006.01)
(52) U.S. Cl. .................. 74/89.23; 74/424.74
(58) Field of Classification Search .................. 74/89.14, 74/89.23, 89.36, 424.71; 384/129, 275, 276, 384/295, 296
See application file for complete search history.

(56) References Cited

U.S. PATENT DOCUMENTS

| | | | | |
|---|---|---|---|---|
| 4,645,159 A * | 2/1987 | Terada et al. | .................. | 248/429 |
| 4,790,202 A * | 12/1988 | Hayashi et al. | .................. | 74/396 |
| 5,048,786 A * | 9/1991 | Tanaka et al. | .................. | 248/429 |
| 5,222,402 A * | 6/1993 | White et al. | .................. | 74/89.14 |
| 5,797,293 A * | 8/1998 | Chaban | .................. | 74/89.36 |
| 5,816,555 A * | 10/1998 | Ito et al. | .................. | 248/429 |
| 5,860,319 A * | 1/1999 | Via | .................. | 74/89.36 |
| 5,876,096 A * | 3/1999 | Yamakami | .................. | 297/344.13 |
| 6,053,063 A * | 4/2000 | Oetjen | .................. | 74/424.92 |
| 6,260,922 B1* | 7/2001 | Frohnhaus et al. | .................. | 297/330 |
| 6,464,421 B1* | 10/2002 | Kiefer | .................. | 403/21 |
| 6,808,233 B2* | 10/2004 | Mallard | .................. | 297/344.1 |
| 6,971,620 B2* | 12/2005 | Moradell et al. | .................. | 248/422 |
| 7,051,986 B1* | 5/2006 | Taubmann et al. | .................. | 248/429 |
| 7,143,513 B2* | 12/2006 | Taubmann et al. | .................. | 29/893.1 |
| 2004/0206195 A1* | 10/2004 | Landskron et al. | .................. | 74/89.14 |
| 2006/0060015 A1* | 3/2006 | Hofschulte et al. | .................. | 74/89.23 |
| 2006/0249644 A1* | 11/2006 | Folliot et al. | .................. | 248/429 |

FOREIGN PATENT DOCUMENTS

| | | |
|---|---|---|
| DE | 101 39 631 A1 | 3/2003 |
| DE | 102 30 514 B4 | 1/2004 |
| DE | 103 08 028 A1 | 9/2004 |
| EP | 1 068 093 B1 | 1/2001 |

* cited by examiner

*Primary Examiner* — William C Joyce
*Assistant Examiner* — Terence Boes
(74) *Attorney, Agent, or Firm* — The Nath Law Group; Jerald L. Meyer; Stanley N. Protigal

(57) ABSTRACT

A gear for an adjusting device with includes a gear spindle (5) and a spindle nut (30) exhibiting an internal thread (32). The spindle nut (30) rests on the spindle (5) and the inner thread (32) of the spindle nut (30) engages with the spindle thread (27). A bearing sleeve (15), which exhibits a bearing section (19) for supporting the spindle nut (30), is provided on either side of the spindle nut (30). At least one bearing sleeve (15) has a guide section (25) for guiding the spindle nut (30) relative to thread spindle (5).

19 Claims, 4 Drawing Sheets

GEAR FOR AN ADJUSTING DEVICE

The invention relates to a gear for an adjusting device, particularly one inside a power vehicle, preferably for a seat adjusting device inside an power vehicle, in accordance with the features of the preamble of claim 1.

A known drive exhibiting a gear for seat adjusting devices is described in EP 1 068 093 B1. The drive is depicted in FIG. 1 of that publication, as well as in FIG. 1 below. As can be seen from the figure, a fastening plate 1, on which the seat of a power vehicle is to be mounted, is attached to an upper rail 3. Fastening clips 10 for a motor 2 are provided so that the motor can be securely attached to the fastening plate 1 and thus to the upper rail 3. Drive shafts 11 are positioned on either side of the motor 2. Flexible shafts may be employed to this end. These drive shafts 11 create a connection to a gear 9, which is described in detail in EP 1 068 093 B1. This gear 9 rests in a U-shaped mounting bracket 8 exhibiting fastening holes 7, by means of which the gear 8 can be secured to the upper rail 3.

Either directly or by means of adjusting elements and/or bearing elements, the upper rail 3 slides on a lower rail 4 that is fixed to the floor of the power vehicle.

In their functional position, the upper rail 3 and the lower rail 4 are so positioned by their bearing surfaces and contact areas that a cavity is formed. A threaded spindle 5 is positioned inside of this cavity. This threaded spindle 5 is held between mountings 6, which are firmly attached to the lower rail 4. To this end, the mountings 6 are provided with fastening holes through which suitable screw connections or similar fastening means project. These means are secured in fastening holes in the lower rail 4. The spindle 5 itself is firmly screwed into the mountings 6 by suitable fastening nuts.

FIG. 2 gives a detailed depiction of the gear 9 shown in FIG. 1. The gear 9 consists of a drive screw 20, which engages with a spindle nut 30 by means of external toothing. The drive screw 20 is connected by a drive shaft 11 to the motor 2. The spindle nut 30 has an inner thread 32, which meshes with the threaded spindle 5. When the motor spins, its motion is transmitted by the drive shafts 11 to the drive screw 20. The drive screw 20 transmits its rotary motion to the spindle nut 30. Since in this known arrangement the threaded spindle is mounted in torque-proof fashion in the lower rail, the gear 9 is forced to execute a longitudinal motion, as is the upper rail 3 connected to it, including the mounted automobile seat.

As can be seen from FIG. 2, the gear 9 exhibiting the drive screw 20 and the spindle nut 30 is positioned in a housing consisting of four housing plates 14. This housing with the four housing plates 14 is positioned in the U-shaped throat of the mounting bracket 8. Both the driver screw 20 and the spindle nut 30 exhibit annular protrusions on their faces; these protrusions are designated by the reference numerals 21 and 31. The annular protrusions 21, 31 are mounted in corresponding holes in the housing plates. To this end, the individual housing plates 14 have bearing sleeves 14a. The bearing sleeves 14a, which in this case form a single piece with the housing, can also take the form of independent components, which are inserted into the housing holes. To deal with axial contact, washer disks 16 are mounted on the indicated annular protrusions 31 of the worm gear 30; the washer disks 18 are likewise mounted on the annular projections 21 of the drive screw 20. These washer disks 16, 18 are particularly necessary for the spindle nut 30, since in the cylindrical outer toothing conventionally found in this kind of spindle nut 30 the frontal areas of the worm gear 30 are non-continuous. The washer disks 16, 18 are required in order to reduce wear. The washer disks for the spindle nut can be omitted in a special embodiment of the outer thread, one with an enveloping gearing that exhibits a cylindrical section. This gearing is the subject matter of another invention and is depicted in FIG. 3.

As mentioned above, the bearing sleeves 14a depicted in FIG. 2 can also be embodied as independent components, which are positioned between the spindle nut 30 and other components, particularly the housing. FIG. 3 depicts a spindle nut 30 with this kind of independent bearing sleeve 15. The spindle nut 30 has a circumferential outer toothing, in order to mesh with a drive screw, which is not depicted in FIG. 3. The bearing sleeves 15 of the spindle nut 30 have a cylindrically shaped bearing section 19 with a smooth inner wall. When the gear 9 is assembled the bearing sleeves 15 rest with their bearing sections 19 on the protrusions 31 of the spindle nut 30, in order to support the spindle nut 30 in a manner that permits rotation. A cylindrical plug-in section 17, which is positioned at a distance radially and axially from the bearing section 19, makes it possible to insert each of the bearing sleeves 15 in a hole applied to an undepicted component (e.g., a housing plate 14 in accordance with FIG. 1). A rectangular, radially projecting fastening section 12 makes it possible to mount the spindle nut 30 in the drive housing in torque-proof fashion. The axial length of the bearing sleeves 15 matches the length of the protrusions 31. The depicted bearing sleeves 15 have the exclusive function of supporting the spindle nut, both axially and radially.

The known gear has proved itself in actual practice, and its operation is quiet. In the automobile industry, however, there is an ongoing desire to create gears with an ever lower noise development.

BRIEF DESCRIPTION OF THE DRAWINGS

The present disclosure is next described in greater detail on the basis of exemplary embodiments shown in the figures. Shown are:

FIGS. 7a and 7b show a configuration of the gear in which a bearing sleeve is designed so as to form a single piece with a structural component of the gear.

DETAILED DESCRIPTION

Figure 1:
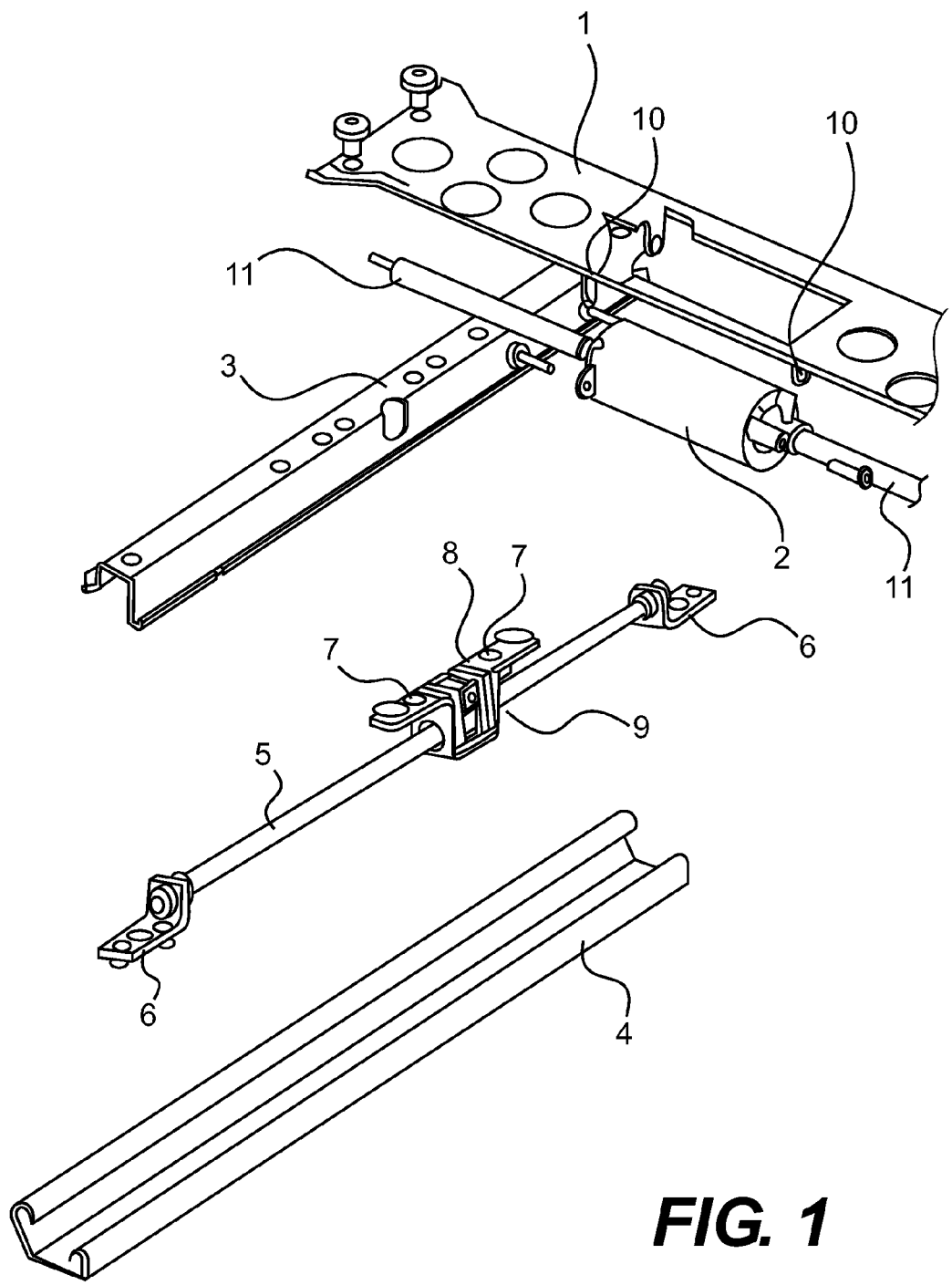
FIG. 1 shows the already explained drive according to the prior art, with a gear that can be driven along a spindle.
Figure 2:
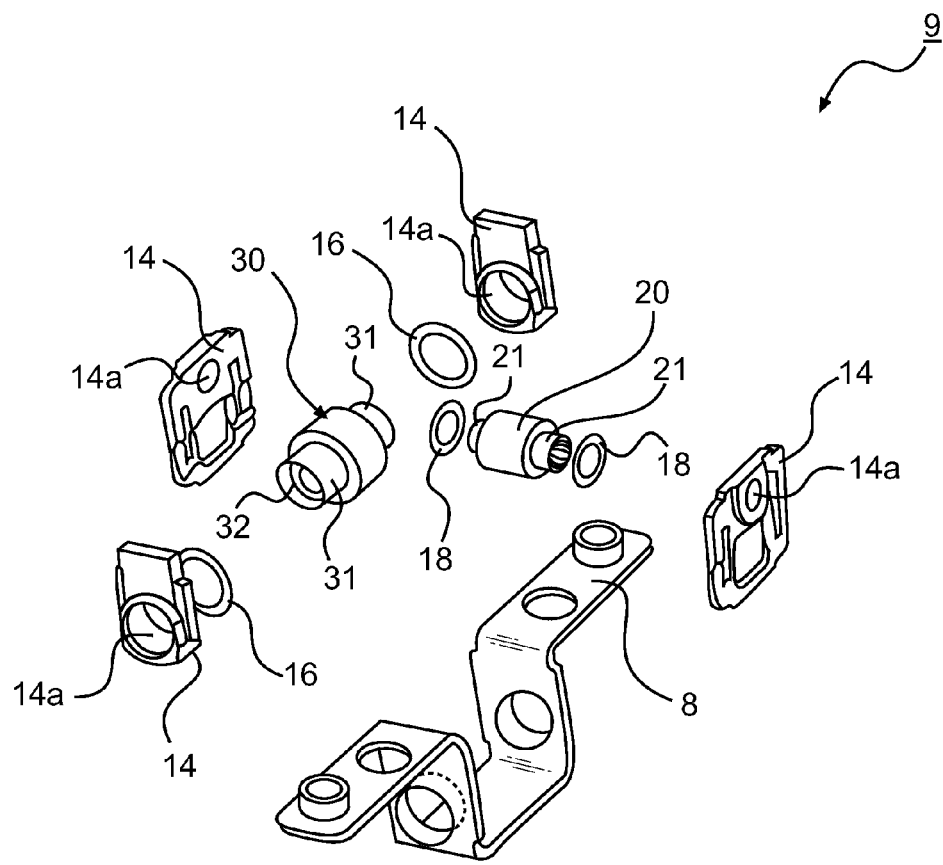
FIG. 2 shows the already explained gear of FIG. 1, in an exploded view showing the drive screw and the spindle nut.

The present disclosure is therefore based on the problem of specifying a gear for an adjusting device with as low a noise development as possible.

This problem is solved with a gear for an adjusting device, with a spindle nut exhibiting an inner thread resting on a threaded spindle and the inner thread of the spindle nut engaging the spindle thread. A bearing sleeve is provided on either side of the spindle nut (30) in order to support the spindle nut (30), and at least one of the bearing sleeves is provided in order to guide the spindle nut relative to the threaded spindle.

Noise development is considerably reduced during the process of adjustment by the fact that at least one bearing sleeve, and preferably both bearing sleeves, exhibit not only the bearing section for the axial and/or radial support of the spindle nut but also a guide section for guiding the spindle nut relative to the threaded spindle. In addition to functioning as a support for the spindle nut, the bearing sleeve also fills the purpose of guiding the spindle nut relative to the threaded spindle. With the provision of a guide section the axial alignment of the threaded spindle and the spindle nut is optimized for varying loads, particularly during the forward and backward movement of the seat. An homogeneous noise behavior during the process of adjustment is thereby achieved for varying load conditions, independent of the design and the surface roughness of the spindle thread.

There are basically two possibilities for physically realizing the bearing sleeves in the gear. According to a preferred embodiment, the bearing sleeves are independent structural components and are made specifically of plastic. However, it is also conceivable to integrate the bearing sleeves directly into the housing, so that they become a single piece with the housing design. In either case, the principle concern is to supplement the bearing section by providing a guide section.

To optimize the guide characteristics of the guide section it is provided that the guide section is cylindrical in shape. The guide section thus has the shape of a tube, which encompasses the threaded spindle over an axial section, at least partially, but preferably over the spindle's entire circumference. It is advantageous if the guide section is not provided with an inner thread. In one embodiment, the inner surface of the guide section is smooth. This reduces friction and thus the development of noise.

It is advantageously provided that the play between the guide section's inner wall, which is preferably cylindrical, and the outer diameter of the threaded spindle is from about 0.05 to 0.5 mm, particularly 0.1 to 0.2 mm.

So that the guide section will exhibit adequate guide characteristics, one configuration provides that the minimal axial length of the guide section is equal to the division of the spindle thread. The division of a thread is equal to the separating distance between two adjacent ridges of identical orientation along the diametric line of the ridge. For single-flight threads the division and the pitch of the spindle thread are identical. For multi-flight spindle threads the division is equal to the quotient of the spindle thread pitch and the number of thread flights.

In one advantageous embodiment, it is provided that the spindle nut exhibits an annular protrusion that forms a single piece with the nut, on at least one, but preferably on two, of its faces; and that the bearing sleeve rests on the protrusion with its bearing section, particularly with an axial bearing section, in order to radially support the spindle nut. The play between the bearing section and the protrusion is such that the rotation of the spindle nut in the bearing section is as free as possible of friction. The guide section adjoins the bearing section in the axial direction. The inner diameter of the guide section here is smaller than the inner diameter of the bearing section. The guide section rest directly against the protrusion or, as the case may be, the bearing section, or it may border it at an axial distance.

In a further configuration it is provided that the guide section is slotted in the axial direction. To this end, it is advantageous if two opposite, axially oriented slots are provided.

On at least one and preferably two of its faces it is also conceivable for the spindle nut to exhibit an annular protrusion that forms a single piece with the spindle nut, and such that the annular protrusion encompasses the bearing section of the bearing sleeve. This variant differs from the previously described embodiment in that the spindle nut is rotationally mounted on the outer circumference of the bearing sleeve. The bearing sleeve reaches into the spindle nut in the axial direction. An advantage provided by this embodiment is that axial length of the thread supporting the spindle nut is reduced, with the result that friction, and with it the noise development, is further diminished.

This last described embodiment of the bearing sleeve makes it possible to extend the guide section over the entire axial length of the bearing sleeve. This provides an optimal axial alignment between the threaded spindle and the spindle nut.

Figure 4:
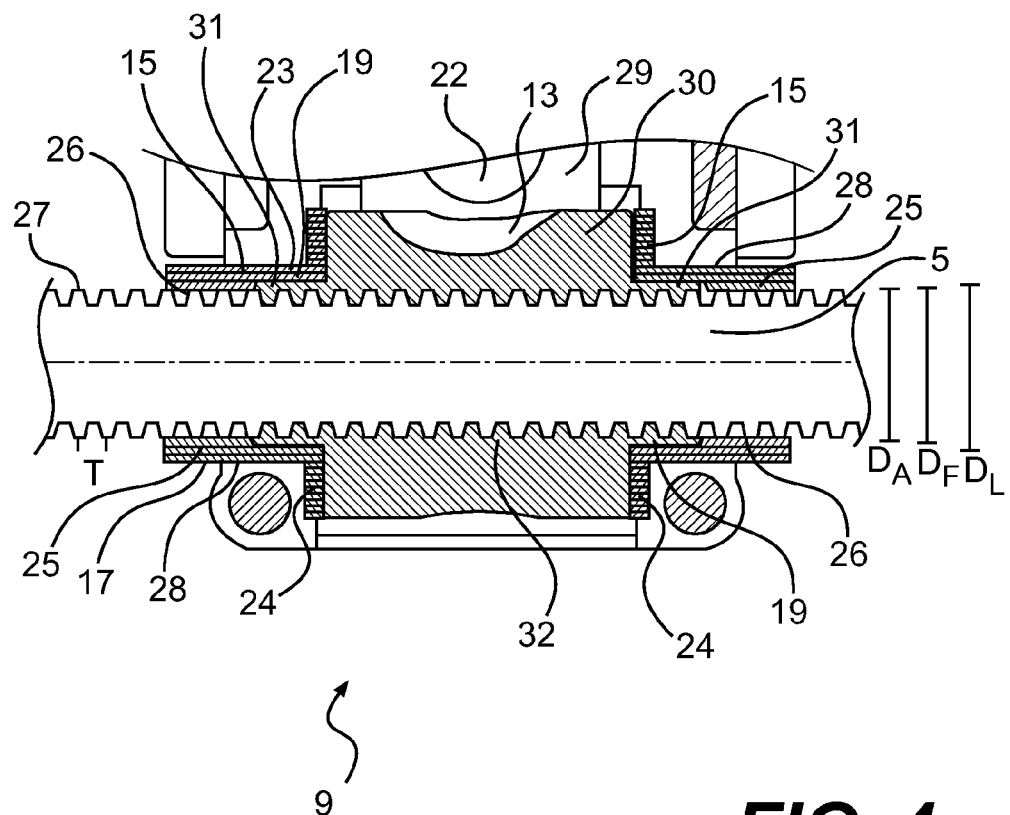
FIG. 4 shows a partial section of a gear.

The gear 9 shown in FIG. 4 consists of a threaded spindle 5 and a spindle nut 30, which exhibits an outer thread 13 and an inner thread 32 and which is mounted on the threaded spindle 5.

The outer gearing 13 of the spindle nut 30 meshes in conventional fashion with a drive screw (not depicted), which is mounted in the recess 22 in a way that permits rotation. An annular protrusion 31 is joined to either face of the spindle nut 30, so as to form a single piece with said spindle nut 30. The inner thread 32 of the spindle nut 30 continues until it reaches the axial terminal point of the protrusion 31.

A bearing sleeve 15 is provided on each side of the spindle nut 30. Both bearing sleeves 15 are independent structural components and are made of plastic. Each bearing sleeve 15 exhibits a bearing section 19. This bearing section 19 consists of an axial bearing section 23 and a radial bearing section 24. Both bearing sections 23 and 24 are rotationally symmetrical in design. The axial bearing section 23 serves to support the spindle nut 30 radially. To this end, the protrusions 31 of the spindle nut 30 are inserted into the axial, tube-like bearing sections 23 of the bearing section 18 in such a way as to permit radial play. The axial bearing function of the bearing section 19 is assumed by the radial bearing section 24.

A tubular guide section for guiding the spindle nut 30, which is mounted in the bearing sleeve 15, on the threaded spindle 5 directly borders the protrusions 31 or, as the case may be, the axial bearing section 23 of the bearing section 19. This guide section 25 has a cylindrical shape. In the exemplary embodiment the axial length of the guide section 25 is roughly three times the division T of the spindle thread 27. The guide section 25 has no inner thread 26, and the surface of the inner wall 26 of the guide section 25 is smooth. Between the inner wall 26 of the guide section 25 and the outer diameter $D_A$ of the threaded spindle there is play of about 0.1 to 0.2 mm. The inner diameter of the guide section $D_F$ is smaller than the inner diameter $D_L$ of the axial bearing section 23 of the bearing section 19. Each bearing sleeve 15 has a plug-in section 17, which is formed by the cylindrical jacket of the guide section 25 and the axial bearing section 23. The plug-in section 17 allows each bearing sleeve 15 to be inserted into a hole 28 in a housing 29, which preferably consists of housing plates.

Figure 5:
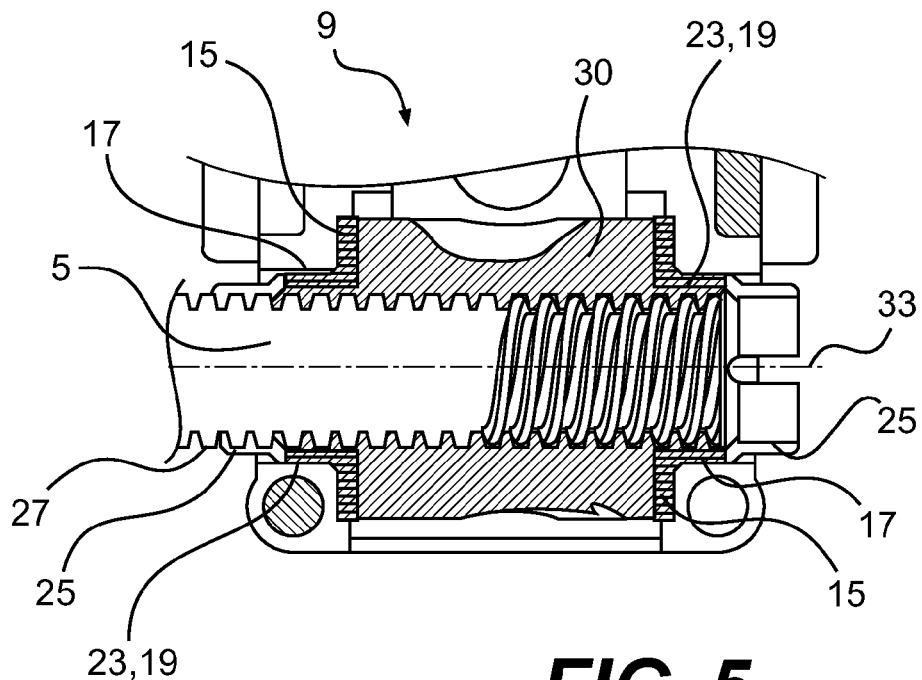
FIG. 5 shows a configuration of the gear, modified from FIG. 4.

FIG. 5 shows another exemplary embodiment of a gear 9 with a spindle nut 30. For the sake of simplicity, FIG. 5 does not show the drive screw 20.

Figure 3:
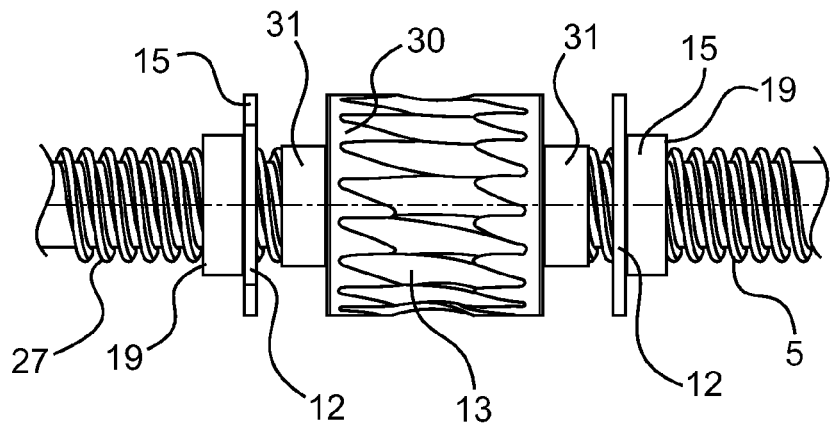
FIG. 3 shows the already explained spindle nut, with independent bearing sleeves.

There is a bearing sleeve 15 on either side of the spindle nut 30. The plug-in section 17 of the bearing sleeves 15 is formed only by the outer circumference of the axial bearing section 23 of the bearing section 19. The guide section 25 is radially stepped relative to the plug-in section 17 and thus has a smaller outer diameter. In order to equalize changes in alignment between the spindle axis and the axis of the bearing sleeve as the gear moves along the threaded spindle 5, the guide section 25 is provided with at least two axial slots 33, which preferably will be positioned diametrically opposite each other. It will also be seen that the guide sections 25 in the exemplary embodiment depicted in FIG. 5 rest without play on the threaded spindle 5, or—as the case may be—the spindle thread 27. This is in contrast to the exemplary embodiments shown in FIGS. 3, 4, and 6.

Figure 6:
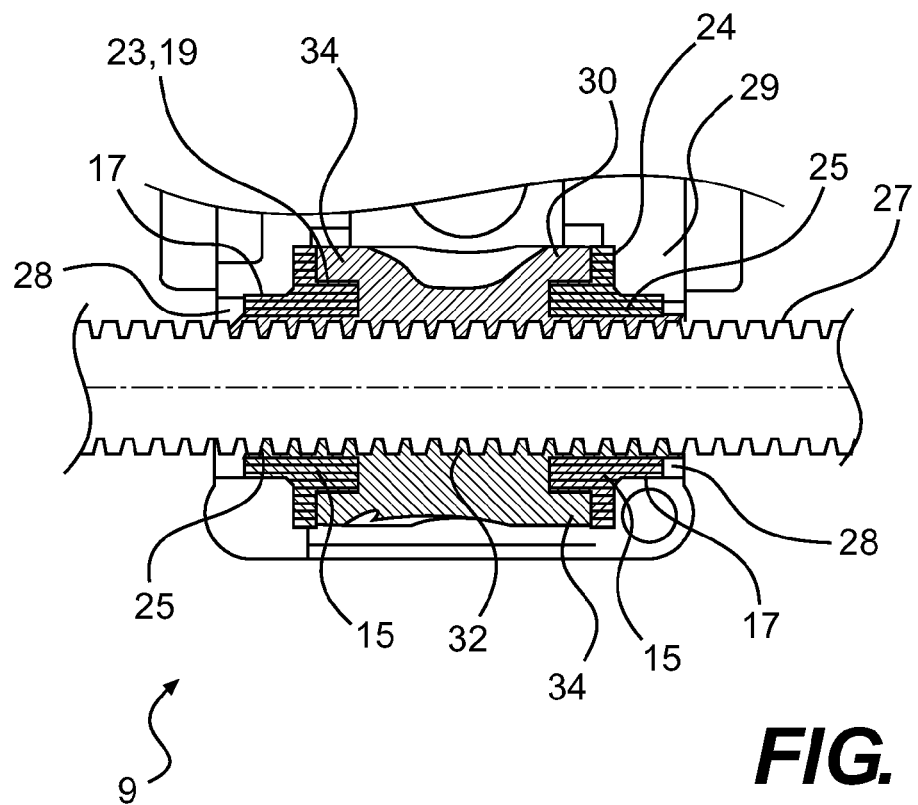
FIG. 6 shows another configuration of the gear.

In the gear 9 depicted in FIG. 6 the spindle nut 30 is shown in section, so that the inner thread 32 is visible. In contrast to the other exemplary embodiments, the axial length of the load-bearing inner thread 32 is shortened. This is due to the fact that the bearing sleeves 15 project axially into the spindle nut 30 on either side. For this purpose, the spindle nut 30 has two annular protrusions 34 formed on its two faces. The axial bearing section 23 of the bearing sleeve 15 is received inside of these protrusions 34. The radial bearing section 24 is located between the housing 29 and the protrusion 34 of the spindle nut 30. The guide section 25 is positioned coaxially with the axial bearing section 23 and runs over the entire length of the bearing sleeve 15. The plug-in section 17, by means of which the bearing sleeve 15 is mounted in the housing hole 28, is positioned coaxial to the guide section 25.

FIGS. 7a and 7b are diagrams depicting a configuration of the gear 9 in which the bearing sleeve 15 is designed so as to form a single piece with a structural component of the gear 9. This configuration shows that the bearing sleeve 15 is designed so as to form a single piece with a structural component of the gear 9 and the housing part 14, 29.

LIST OF REFERENCE NUMERALS

1 fastening plate
2 motor
3 upper rail
4 lower rail
5 threaded spindle
6 fastenings
7 attachment holes
8 mounting bracket
9 gear
10 fastening clips
11 drive shafts
12 fastening section
13 outer gearing
14 housing plates
14a bearing sleeve integrated into housing plates
15 independent bearing sleeves
16 washer disk
17 plug-in section
18 washer disk
19 bearing section
20 drive screw
21 protrusion
22 recess
23 axial bearing section
24 radial bearing section
25 guide section
26 inner wall
27 spindle thread
28 hole
29 housing
30 spindle nut
31 protrusion
32 inner thread
33 axial slot
34 protrusion
$D_F$ inner diameter of guide section
$D_L$ inner diameter of axial bearing section
$D_A$ outer diameter of threaded spindle
T division of spindle thread

The invention claimed is:

1. Gear for an adjusting device, with a threaded spindle and a spindle nut exhibiting an inner thread, where the spindle nut rests on the threaded spindle and the inner thread of the spindle nut engages with the spindle thread comprising an outer diameter, the gear comprising:
   first and second bearing sleeves provided on first and second sides of the spindle nut, the first and second bearing sleeves respectively having first and second bearing sections supporting the spindle nut radially; and
   a guide section mounted on the first and second bearing sleeves, the guide section guiding the spindle nut relative to the threaded spindle, wherein:
   the guide section comprises an inner diameter corresponding to the outer diameter of the spindle thread and is smaller than the inner diameters of the first and second bearing sections,
   the guide section and first and second bearing sections face the threaded spindle at axially different positions,
   the spindle nut has an annular protrusion forming a single piece with the spindle nut,
   at least one of the respective bearing sections of the first and second bearing sleeves is disposed about the protrusion, and
   the guide section borders the protrusion in the axial direction.

2. Gear according to claim 1, wherein the first and second bearing sleeve sections supporting the spindle nut have an axial bearing section.

3. Gear according to claim 1, wherein the guide section is cylindrical in shape.

4. Gear according to claim 1, wherein the guide section does not have an inner thread.

5. Gear according to claim 1, wherein the inner wall of the guide section is smooth.

6. Gear according to claim 1, wherein the inner diameter of the guide section is equal to the outer diameter of the spindle thread plus an amount to allow for play.

7. Gear according to claim 6, wherein the play ranges from 0.05 mm to 0.5 mm.

8. Gear according to claim 6, wherein the play ranges from 0.1 mm to 0.2 mm.

9. Gear according to claim 1, wherein the guide section rests on the threaded spindle without play.

10. Gear according to claim 1, wherein the guide section has an axial length which corresponds to a division of the spindle thread.

11. Gear according to claim 1, wherein the guide section extends over the entire length of the bearing sleeve.

12. Gear according to claim 1, wherein the guide section is slotted in the axial direction.

13. Gear according to claim 1, wherein the bearing sleeve forms an independent structural component having a plug-in section inserted into a component of the gear.

14. Gear according to claim 1, wherein the bearing sleeve forms a single piece with a structural component of the gear.

15. Gear according to claim 1, wherein the bearing sleeve is made of plastic.

16. Gear according to claim 1, wherein the adjusting device is a seat adjusting device for a power vehicle.

17. Gear according to claim 1, wherein the guide section is slotted in the axial direction with two diametrically opposite slots.

18. Gear according to claim 1, wherein the bearing sleeve forms a single piece with a structural component of the gear with a housing part.

19. Gear according to claim 1, wherein the bearing sleeve forms an independent structural component having a plug-in section inserted into a housing part of the gear.

\* \* \* \* \*